Aug. 20, 1935.  F. A. WHITELEY  2,011,787
THERMOSTAT CONTROL FOR AIR CONDITIONERS FOR ROOMS
Original Filed Jan. 25, 1932   5 Sheets-Sheet 1

Inventor:
F. A. Whiteley
By *Whiteley and Ruckman*
Attorneys.

Aug. 20, 1935.  F. A. WHITELEY  2,011,787
THERMOSTAT CONTROL FOR AIR CONDITIONERS FOR ROOMS
Original Filed Jan. 25, 1932  5 Sheets-Sheet 2

Inventor:
F. A. Whiteley.
By Whiteley and Ruckman
Attorneys.

Aug. 20, 1935.  F. A. WHITELEY  2,011,787
THERMOSTAT CONTROL FOR AIR CONDITIONERS FOR ROOMS
Original Filed Jan. 25, 1932  5 Sheets-Sheet 5

Inventor:
F. A. Whiteley
By
Whiteley and Ruck
Attorneys

Patented Aug. 20, 1935

2,011,787

UNITED STATES PATENT OFFICE 2,011,787

THERMOSTAT CONTROL FOR AIR-CONDITIONERS FOR ROOMS

Frank A. Whiteley, Minneapolis, Minn.

Application January 25, 1932, Serial No. 588,578
Renewed March 26, 1934

12 Claims. (Cl. 236—44)

My invention relates to thermostat controls for air-conditioners for rooms, and has for its object to provide control mechanism operative to regulate the supply of heat and moisture to rooms for winter air-conditioning and the withdrawal of heat and moisture from rooms for summer air-conditioning.

It is a particular object of my invention to provide a single thermostat for controlling both the two above named sets of operations, with means in said thermostat to determine the maximum temperatures for winter air-conditioning and the minimum temperatures for summer air-conditioning.

It is a further object of my invention to provide a thermostat having a contact surface having portions formed of electrical conducting material and another portion formed of electrical non-conducting material with means for causing an electric circuit to close through contacting with said conducting material and for causing the same circuit to close through contacting with said non-conducting material.

It is a particular object of my invention to provide thermostat controls for basement unit devices for summer and winter air-conditioning such as is described and claimed in my pending application Serial Number 556,789, filed August 13, 1931, and for wall unit summer and winter air-conditioning devices such as is described and claimed in my pending application Serial Number 562,249, filed September 11, 1931, of which this application is in some particulars a continuation, as it is also in some particulars a continuation of my co-pending applications Serial Number 261,775, filed March 15, 1928, and Serial Number 466,689, filed July 9, 1930.

The full objects and advantages of my invention will appear in connection with the detailed description thereof, and its novel features are herein particularly pointed out in the claims.

In the drawings, illustrating my invention as applied to several types of air-conditioning apparatus:

Fig. 4 is a side sectional elevation of one portion, Fig. 5 a similar side sectional elevation of another portion, and Fig. 6 a sectional plan through the blower box, and Fig. 7 a view of the fastening detail for the cover, all of Figs. 3 to 7 inclusive showing features and parts controlled of a wall-unit summer and winter air-conditioner in position in a wall, of the type disclosed in my aforesaid application Serial No. 562,249.

Figures 1, 2:
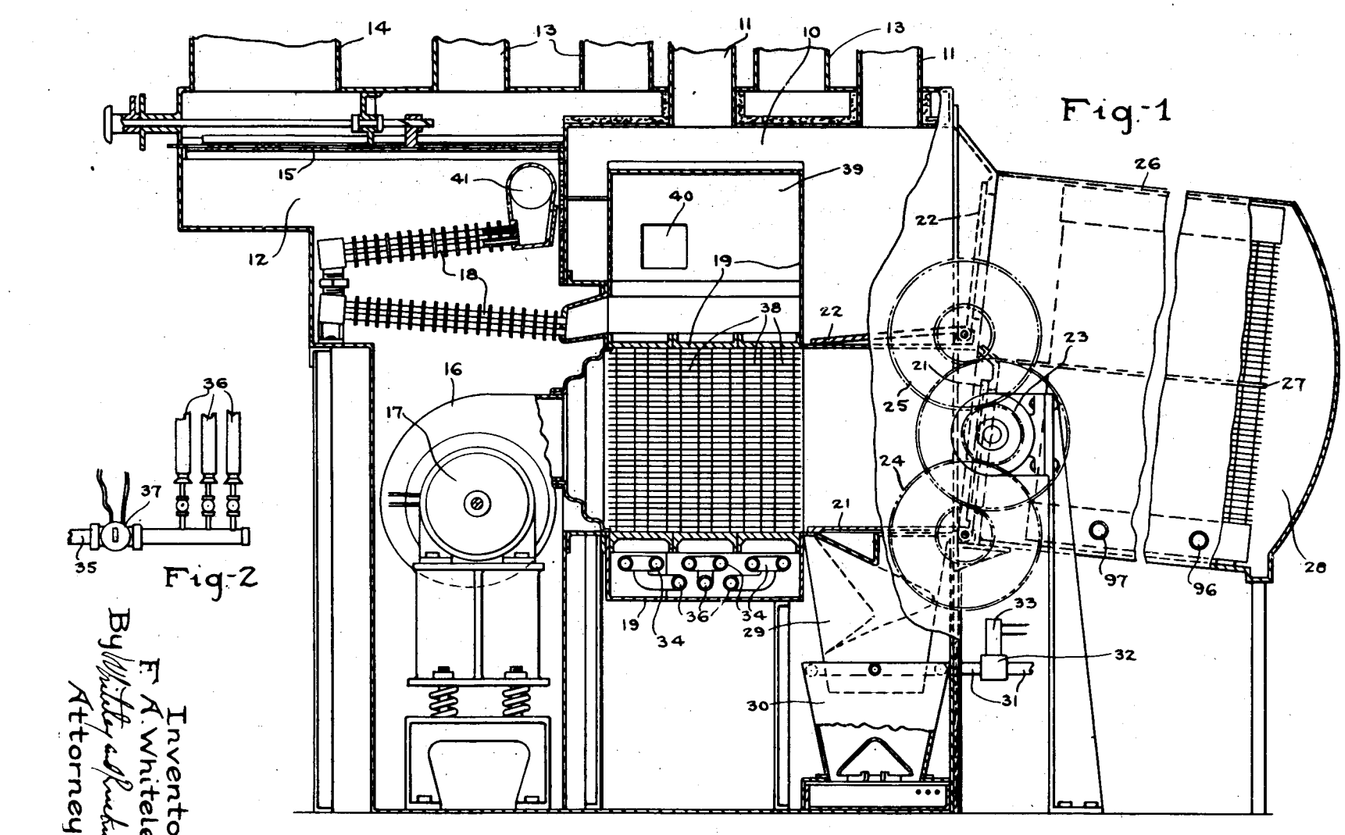
Fig. 1 is a longitudinal cross-sectional elevation of a basement summer and winter air-conditioner of the type described and claimed in my aforesaid application Serial No. 556,789 showing parts controlled by my thermostat invention.
Fig. 2 is a fragmentary plan view of the gas valve for such apparatus.
Figures 8, 9:
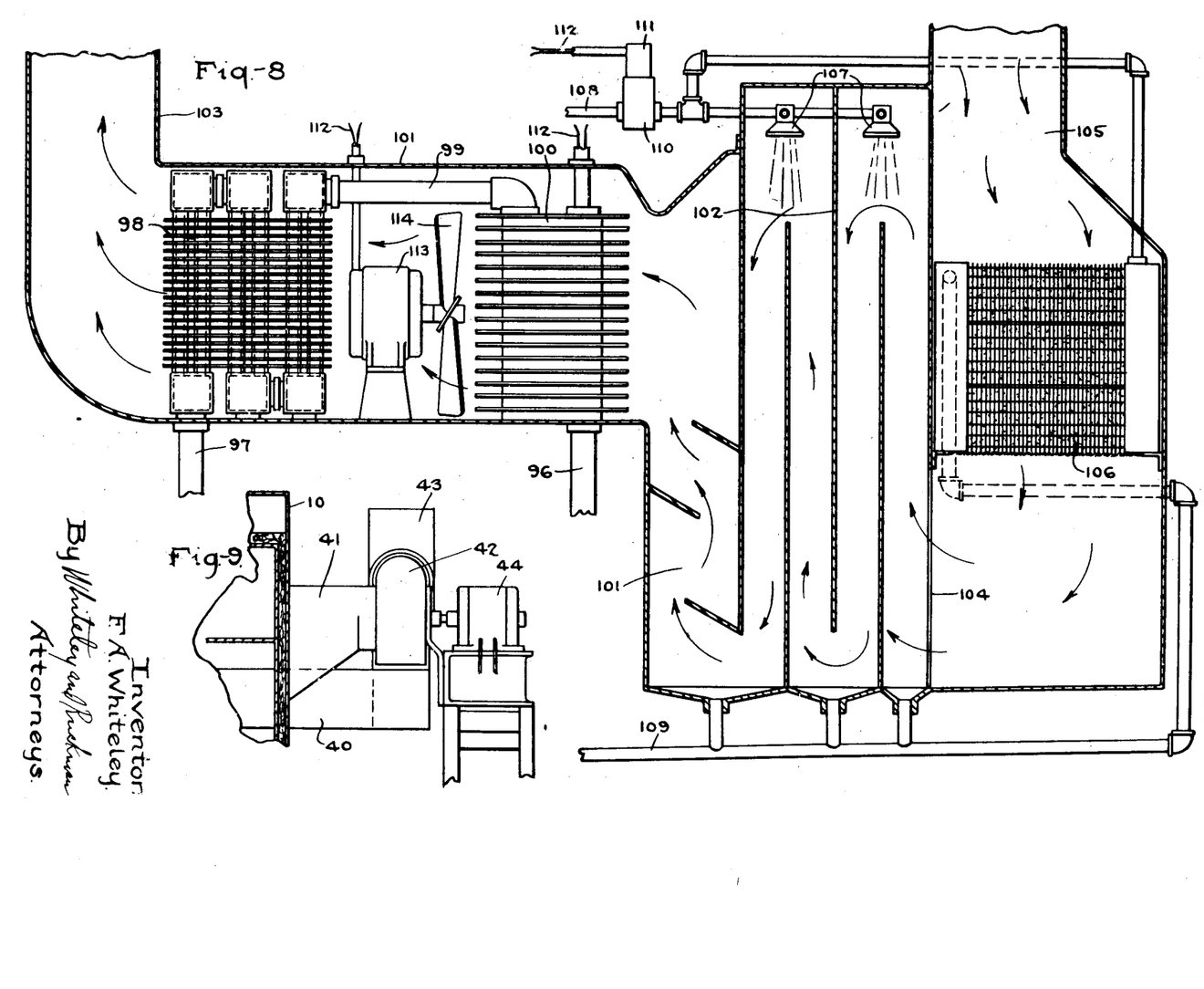
Fig. 8 is a sectional part diagrammatic elevation view of a form of air-cooling apparatus employed in connection with the above referred to types of summer and winter air-conditioners, said air-cooling apparatus being of the character shown in my aforesaid application Serial No. 545,175, showing the controls to be operated.
Fig. 9 is a fragmentary elevation view of the stack blower and motor employed in the apparatus of Fig. 1.

The air-conditioner shown in Figs. 1, 2, and 9 comprises a casing to be located in the basement of houses, embodying an air-delivery chamber 10, with air-delivery pipes 11 leading therefrom to the rooms of the house, and an air-inlet chamber 12 having air-return pipes 13 leading from said rooms thereto, and a fresh-air pipe 14 for taking out-door air to the air-inlet chamber, with manually-controlled valve mechanism 15 for regulating the proportion of return air and fresh air going through the system. The air is moved by a blower 16 driven by a motor 17, which is one of the instrumentalities controlled by my thermostat mechanism. The air is drawn into the blower through heat-exchangers 18 extending across the air-inlet chamber, and the air is then driven by the blower through heat-exchanger passages that extend across a fire chamber 19 to an air-transfer chamber 20. From the air-transfer chamber the air is driven into the air-delivery chamber 10 over one or the other of two different routes according to the position of valve doors 21 and 22. These are adapted to be simultaneously operated in either direction by reversing motor 23 and connected gearing, of which gears 24 and 25 are fast respectively on the hinge axes of doors 21 and 22 and will be driven by the motor in the same direction, for swinging the doors 21 and 22 from the full line position shown to the dotted line position or vice versa, according to the direction of current through the motor. And this reversing motor 23 (in effect two distinct instrumentalities) also comprises instrumentalities to be controlled by my thermostat mechanism.

In the full line position of doors 21 and 22 as shown the air is caused to move through heat-exchanger passages in a cooling chamber 26, passing below dividing partition 27 and reversing in chamber 28 to flow back to air-delivery chamber 10, from which, having been cooled and dried in its passage through the cooling chamber, it goes through the delivery pipes 11 to the rooms. When the doors 21 and 22 are moved to the dotted line position the air is caused to travel from the air-transfer chamber 20 downwardly in a cyclone through the air-cleaner and air-moistener members 20 and 30 and out into passages under and alongside of heat chamber 19 to air-delivery chamber 10, from which having been heated and moistened it goes through the delivery pipes 11 to the rooms. Water is delivered to the inner surface of air-moistener member 30 from pipe 31 passing through spring-closing valve 32 adapted to be opened by solenoid 33, which is another instrumentality to be controlled by my thermostat mechanism.

Heat is furnished by gas burners 34 supplied with gas from a main 35 through leads 36. The flow of gas is admitted or cut off by an electrically operated valve 37 of well-known construction, another instrumentality controlled by my thermostat mechanism. The gases of combustion flow through pipes 38 into upper part 39 of heat chamber 19, and from there it may pass to the stack directly through duct 40, but in practice the combustion gases will be drawn from compartment 39 through heat-exchangers 18 and pipe 41 to blower 42 from which they are discharged through pipe 43 to the stack, as shown in Fig. 9. And the motor 44 for driving stack or chimney blower 43 is another electrically-operated instrumentality controlled by my thermostat mechanism.

The wall-unit conditioner shown in Figs. 3 to 7 inclusive embodies similar instrumentalities to be controlled to those heretofore described. It comprises a casing 45 of suitable material such as galvanized sheet steel or sheet aluminum, which is closed on all sides except as hereinafter stated and may be adapted to be positioned between adjacent studding 46, 47 of the wall of a room. The casing opens through a grille 48 at its bottom and may be opened at its top by a register 49. This register, shown in detail in Fig. 5, embodies plates 50 having fingers 51 pivoted to a bar 52 and normally held in closed position by a spring 53 extending between an arm 54 on the bar 52 and a bracket 55 on the casing 45. A solenoid 56 operates through armature lever 57 to open, and hold open against the force of spring 53, the plates 50 of the register 49, an instrumentality, operating with the blower later to be described, to be controlled by my thermostat mechanism.

Within the casing 45 is a heat-exchanger 58 adapted to be supplied with steam or hot water by means of inlet pipe 59 and outlet pipe 60, there being a spring-closed valve 61 on the pipe 60 adapted to be opened by solenoid 62, corresponding to gas valve 37, and an instrumentality controlled by my thermostat mechanism. And in the lower part of casing 45 is a heat-exchanger of very much greater extent than heat-exchanger 58 adapted to be supplied with a cold fluid, as cooled water or solution of salt or of glycerine, through inlet pipe 64 and outlet pipe 65. The inlet pipe 64 may be provided with a spring-closed valve 66 adapted to be opened by solenoid 67, an instrumentality controlled by my thermostat mechanism. Condensed moisture on the fin plates of heat-exchanger 63 will gravitate down said plates into a funnel 68 at the bottom of casing 45 and will be carried off by drain pipe 69.

Figure 3:
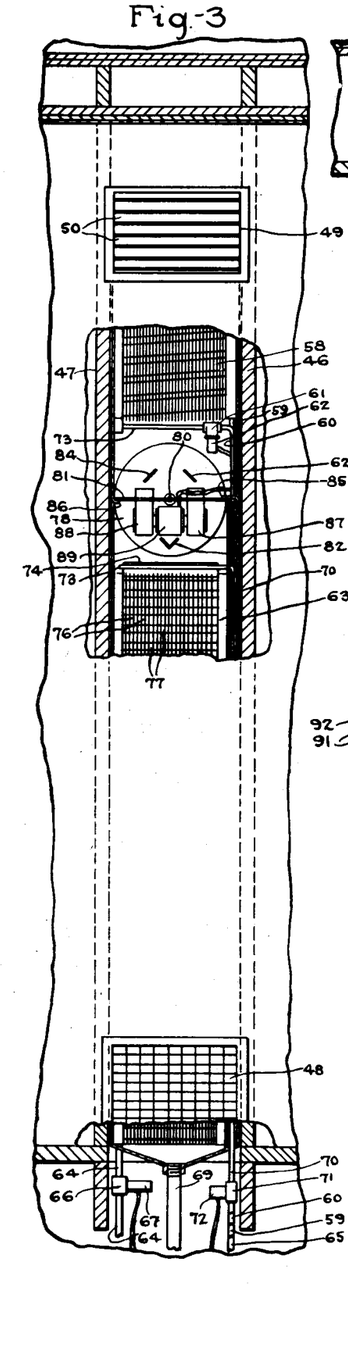
Fig. 3 is a front elevation with some parts in section.
Figure 4:
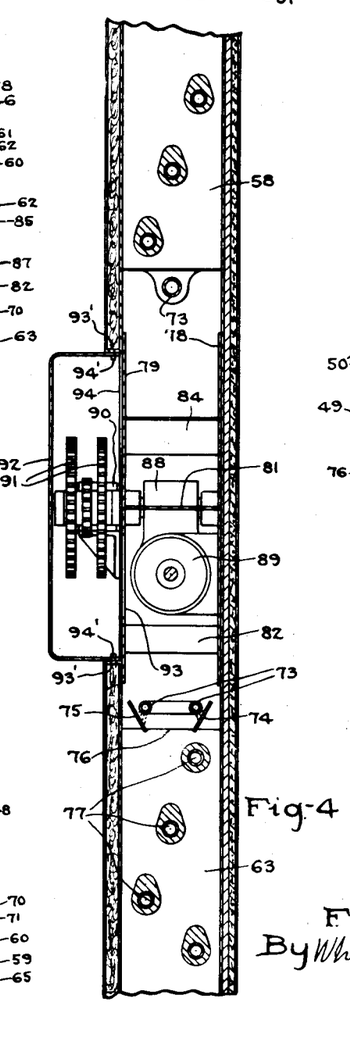
Figure 5:
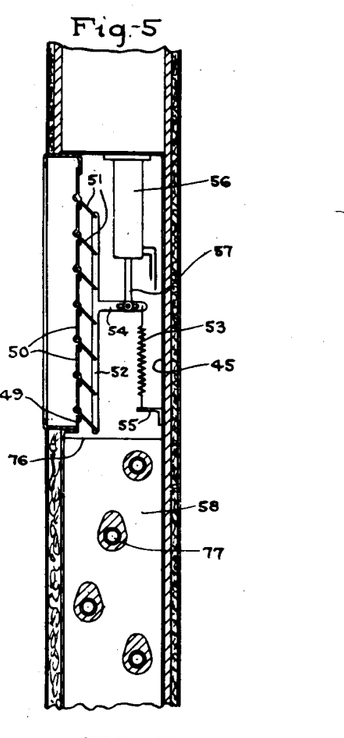
Figure 6:
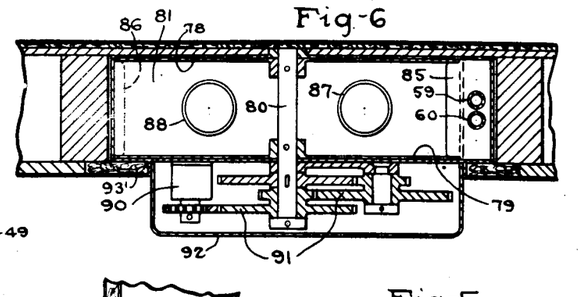

A water pipe 70 is provided with a spring-closed valve 71 adapted to be opened by solenoid 72. Branch pipes 73 overlie and are adapted to discharge water upon a pair of angularly disposed plates 74 and 75, which, as shown in Figs. 3 and 4, embrace with their edges the upper edges of fin plates 76 forming parts of heat-exchanger 63. When the wall unit is used for heating purposes this water valve will be operated, corresponding to operation of water valve 33, an instrumentality controlled by my thermostat mechanism, and the water discharged upon plates 74 and 75 will flow down along and form films on the surfaces of the fin plates 76 connected integrally with fluid carrying pipes 77, thus giving a great moistened surface for evaporation and insuring that the air will be saturated before it goes to the heating radiator. But because the air is heated after it is so saturated the room air cannot be over humidified but will be made to contain always a sufficient amount of moisture.

Figure 7:
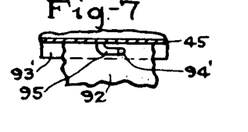

In the wall unit air-conditioner also, it is desirable or necessary to direct the air in different directions when it is used for cooling or heating, respectively. This is accomplished by means analagous to the door-operating means shown in Fig. 1. Two circular plates 78 and 79 are secured within the casing 45 upon a spindle 80 and are held in spaced parallel relation by a transverse separator plate 81, angle member 82 on one side of said plate and a pair of air-spreader plates 83 and 84 on the opposite side of said separator. The open-walled drum thus formed is adapted to be rotated 180 degrees, being restrained in either direction by engagement of separator plate 81 with lips 85 and 86 secured to opposite sides of the casing 45 in diametrical relation to the axis of said plates 78 and 79. A pair of blowers 87 and 88 driven by a motor 89 are secured to circular plate 78 on one side of separator 81, the blowers discharging on the opposite side of separator 81, as clearly shown in Figs. 3, 4 and 6. And it will be apparent that the separator plate 81 and lips 85 and 86 divide the interior of casing 45 into upper and lower separated compartments, so when the blowers are set to discharge into the upper compartment air is drawn in at the bottom grille 48 and discharged at the top through register 49, and when the blowers are set to discharge into the lower compartment air will be drawn through register 49 and be discharged at the bottom through grille 48. The blowers and their carriage are rotated automatically in one or the other direction by a reversing motor 90 secured to a wall of casing 45 and reduction gearing 91 connected with spindle 80 as best shown on Figs. 4 and 6. The blower motor 89 and shutter solenoid 56 are on a common electric circuit and correspond to the blower motor 17 of the apparatus of Fig. 1, and the reversing motor 90 of course corresponds with the door-operating motor 23 of Fig. 1, all being instrumentalities controlled by my thermostat mechanism. A removable cover 92 is applied to the wall-unit air-conditioner to enclose the operating mechanism 90, 91, and permit access to the blowers 87, 88 and blower motor 89 through opening 93 in circular plate 79, and opening 94 in the front wall of casing 48 as shown in Fig. 4. The cover 92 is removably secured within a circular flange 93 fast on the outside wall of casing 45 on which are rigidly secured pins 94 which take into slots 95 in the rim portion of cover 92, as shown in Fig. 7.

The pipes 64 and 65 for circulating cooling fluid, in wall-unit heat-exchanger, may connect directly with pipes 96 and 97 for conveying cooling fluid directly from compressor mechanism such as shown in Fig. 8, which last-named pipes do connect direct with the cooling heat-exchangers of Fig. 1, as indicated in that figure, in which case the control valve 66 will not be used. But in cases where the wall unit heat-exchanger is employed in the rooms of office buildings, hotels, apartment buildings and the like, where the cooling fluid is cooled in a central plant and pumped through the heat-exchangers of the various wall units, the valve 66 will be used, and will, of course be equivalent in the thermostat control system to the compressor mechanism for supplying cooling fluid directly from the compressor mechanism. Or stated in reverse terms the compressor mechanism here shown and described is, in the control system for regulating supply of cooling fluid, essentially the same thing as the central cooling system represented in the supply of cooling fluid by the valve 66.

As described and claimed in my said application Serial No. 562,294 expanded gases from the air-cooling heat exchanger go from pipe 97 through a series of heat-exchangers 98 forming a condenser, and from there through pipe 99 to a compressor 100, and from there through supply pipe 96 back to the air-cooling heat-exchangers. These instrumentalities are housed in a casing opening at the compressor end with a passage 101 leading from an air-cooling washer 102, and at the other end with a stack 103 leading out of doors. The air-washer connects at 104 with a passage which leads out of doors, in which is a cooling and drying chamber 106. Water is delivered to pipes traversing chamber 106 and to sprayers 107 from a feed pipe 108, and this water wastes through pipe 109. A spring-closed valve 110 is opened by solenoid 111, which is on the same electric circuit 112 as the compressor motor, as also a motor 113 of fan 114, whereby air is moved from out of doors through cooling and drying chamber 106 and washing cooling chamber 102, about the compressor (diagrammatically shown) and its heat-exchanger fin plates, through the heat-exchangers of condenser 98, and thence through stack 103 to discharge the removed heat out of doors. The electric circuit 112 corresponds with the electric circuit of solenoid 67 for operating the valve 66, in each case providing supply of cooling liquid and being instrumentalities controlled by my thermostat mechanism.

There are, therefore, in either form of summer and winter air-conditioning means one set of instrumentalities for supplying heat and moisture to the air of rooms and an entirely different set of instrumentalities for withdrawing heat and moisture from the air of rooms. The heating and moistening instrumentalities heretofore described comprise (1) operating door (turning blowers 180° in the wall unit), (2) operating gas valve (steam or hot water valve in the wall unit) and simultaneously operating chimney valve in basement unit, (3) operating main blower (with register shutter added in wall unit), (4) operating water valve for moistening the air. Of these instrumentalities it is desirable that (1) and (2) should operate simultaneously, and (3) and (4) should begin operation simultaneously and the operation of (4) be terminated some time ahead of the termination of (3). But operation of (2) should begin and end some time ahead (say five minutes) of beginning and termination of operation of (4), in order to permit the heat-exchangers to become heated before air begins to come to the rooms, and to permit the heat to be carried into the rooms after the heating of the heat exchangers is terminated.

The cooling and drying instrumentalities comprise (5) operating door (turning blower 180° in wall unit) in either case operating in the opposite direction from the operation of (1). (6) Operating means for delivering cooling fluid (compressor mechanism in basement unit, same or supply valve in wall unit), which is analagous to operation of (2). (7) Operating main blower (with register shutter added in wall unit), the same blower and operating circuit as (3).

The heating and moistening operations (1), (2), (3), and (4) must be controlled independently of the cooling and drying operations (5), (6), and (7) even though (7) is the same as (3). To accomplish this my invention comprises a single thermostat having means to complete two distinct electric circuits, one for the heating side and one for the cooling side, and a separate operator controlled by the respective thermostat circuits for causing operation of the heating and drying instrumentalities respectively.

Figures 10, 11, 14:
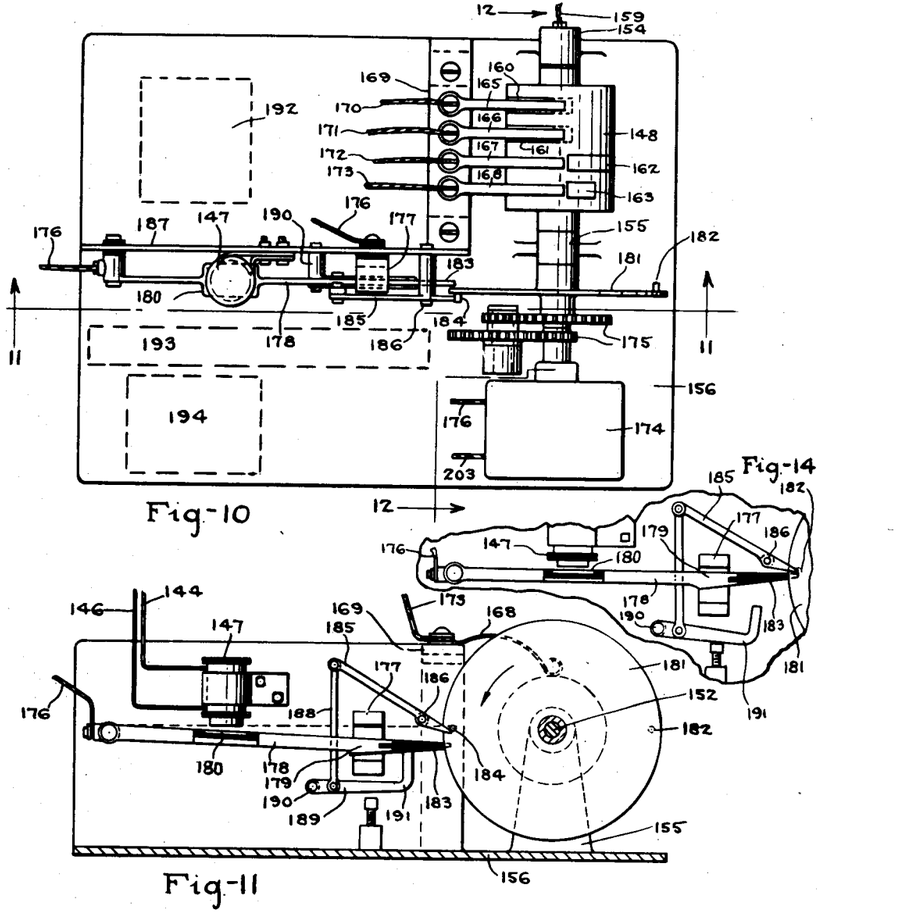
Fig. 10 is a plan view of the base of the thermostat-controlled operator with duplicate parts indicated diagrammatically.
Fig. 11 is a part-sectional side elevation view on line 11—11 of Fig. 10.
Fig. 14 is a fragmentary view similar to Fig. 12 with parts in different positions.
Figure 12:
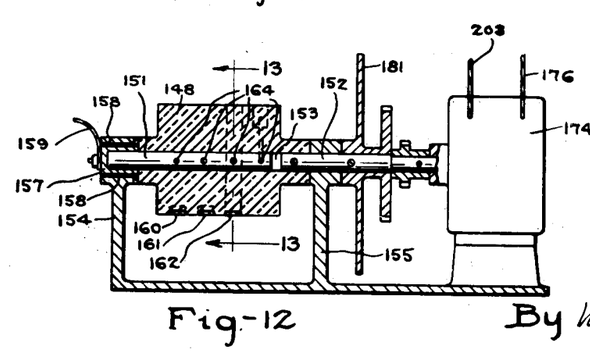
Fig. 12 is a transverse sectional elevation view on line 12—12 of Fig. 10.
Figures 15, 16, 17, 18, 19, 20:
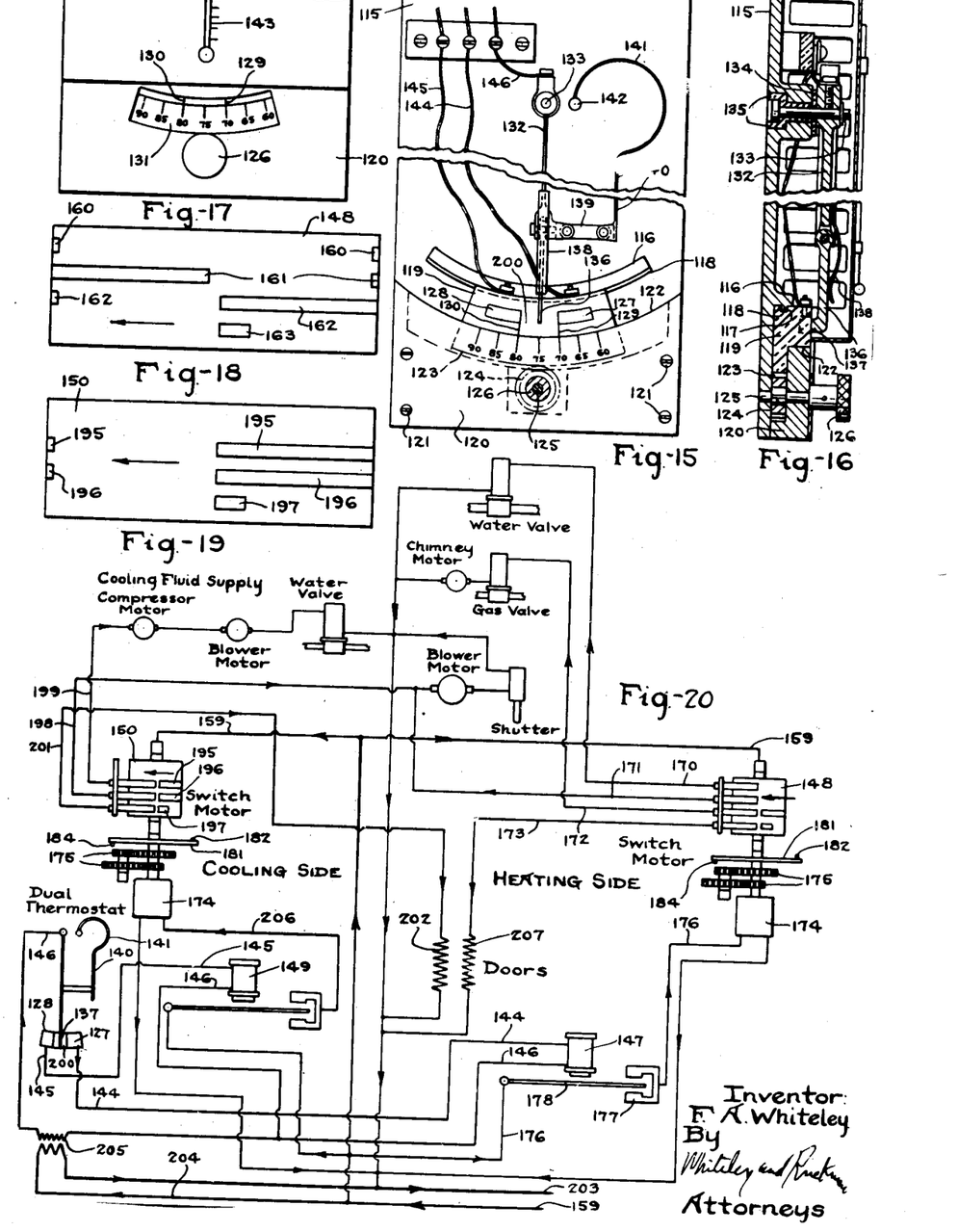
Fig. 15 is a plan view with some parts in section and cover removed of the thermostat.
Fig. 16 is a side sectional elevation of the thermostat.
Fig. 17 is a plan view of the lower part of the thermostat with the cover in position.
Fig. 18 and Fig. 19 are plan developments of the switch-operating cylinder in the controller box.
Fig. 20 is a wiring diagram for the entire control system.

As shown in Figs. 14 and 15, this thermostat comprises a base 115 upon which is formed an arcuate guide piece 116 having a correspondingly formed tongue 117 which enters a corresponding form of groove 118 in a slide 119 of non-conducting material held in position by a bottom piece 120 secured to the base 115 and formed with an arcuate edge 122 concentric with the guide piece 116. The slide 119 has on its lower edge a segment rack 123 which meshes with a pinion 124 on a stem 125 having a thumb-screw 126. By turning the thumb-screw the slide 119 can be moved along the guideway formed by tongue 118 and the guide edge 122 on bottom piece 120. Upon the slide 119 are mounted two metallic contact pieces 127, 128 with an insulated non-conducting surface 200 between them which is flush and even with the surfaces of the contact pieces, all said surfaces lying in the same plane. The adjacent boundaries of the non-conducting surface and the conducting surfaces are marked by straight lines 129, 130 which go to the edge of the slide 119 and form pointers adapted to register with a scale 131 of temperature figures at the edge 122. The pointer 129 indicating the lower temperature figures sets the maximum temperature desired for the heating and moistening operations, and the pointer 130 indicating the higher temperature figures sets the minimum temperature desired for the cooling and drying operations, and the construction is such that either of these limits may be anywhere between 60° and 90°.

A contact arm 132 is pivotally mounted on a post 133 which is mounted on the base 115 but insulated therefrom as indicated at 134 and 135. Upon the arm 132 is mounted a finger having a foot 137 held in resilient engagement with the upper contact surfaces of slide 119 by a leaf spring 138. The arm 132 has a double pivoted connection through link 139 with an arm 140 of a thermostatic member 141 of well-known construction anchored at 142 to the base 115. Changes of temperature will cause the arm 140 and with it the arm 132 and contacting toe 137 to move over the surface of slide 128, moving to right or to left according to whether the temperature falls or rises as indicated by thermometer 143.

The conducting surface 127 is connected with wire 144, conducting surface 128 is connected with wire 145, and the contact arm 132 is connected with wire 146. When the nose 137 contacts with surface 127 an electric circuit is completed through wires 144 and 146, and relay 147 is energized and effects operation of the heating and moistening control switch 148 to start the heating and moistening instrumentalities, and when nose 137 contacts with surface 128 an electric circuit is completed through wires 145 and 146, and relay 149 is energized and effects operation of the cooling and drying control switch 150 to start the cooling and drying instrumentalities all as indicated in the wiring diagram of Fig. 20. And when the nose 137 leaves the contact surface 127 and goes onto the non-conducting surface 200 the breaking of the circuit 144—146, through means hereinafter described, effects operation of heating and moistening control switch 148 to stop operation of the heating and moistening instrumentalities, and when the nose 137 leaves the contact surface 128 and goes onto the non-conducting surface 200 the breaking of the circuit 145—146, through means hereinafter described effects operation of the cooling and drying instrumentalities.

Figure 13:
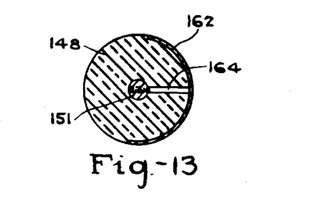
Fig. 13 is a sectional elevation view on line 13—13 of Fig. 12.

The switch 148, as shown in Figs. 10, 11 and 13, comprises a cylinder of non-conducting material rigidly mounted on a broken shaft 151, 152, separated as indicated at 153, having bearings in stands 154, 155 on a base 156. The bearing for shaft portion 151 comprises a metal cap 157 insulated at 158. The main lead-in wire 159 for electric current is connected with shaft 151, and this shaft has conducting contact with switch-bands 160, 161, 162 and 163 through pins 164 threaded into shaft 151 and countersunk in the switch-bands as shown in Fig. 13. Spring contact fingers 165, 166, 167 and 168 are mounted on an insulated bar 169 suitably supported on base 156. As shown in the wiring diagram of Fig. 20, wire 170 goes to the water valve 32, wire 172 goes to the gas valve 37 and chimney motor 44 of the basement air-conditioner or the steam or hot water valve 61 of the wall unit air-conditioner, wire 171 goes to blower motor 16 (including register shutter of the wall unit), wire 173 goes to one of the windings 207 of the door operating motor.

A motor 174, through suitable reducing speed gearing 175, is adapted to turn the switch drum 148 (or in similar manner the switch drum 150) a half revolution in a predetermined time, say five minutes. This motor is operated on an electric circuit including a lead-in wire 176 which has interposed in its length a circuit make-and-break device including a double contact piece 177 and a pivoted arm 178 having a portion 179 for contacting on either side with the respective contact parts of the piece 177. The arm 178 is provided with an armature 180 insulated from the body of arm 178, which is positioned to be attracted by relay 147 when thermostat circuit 144—146 is closed so as to lift the arm against the force of gravity and cause the upper surface of portion 179 thereof to contact with the upper part of double contact piece 177. This closes the circuit to the motor 174 which then turns shaft 152 and parts connected thereto, including a disk 181. This disk carries a pin 182 which when the disk has been turned a half revolution will engage an insulation extension 183 an arm 178 and push the arm 178 down against the force exerted by the solenoid 147. This will break the circuit operating motor 174, which will then stop. But since the thermostat circuit is still closed the force exerted by relay 147 upon armature 179 will continue to hold the arm 178 up with its extension 183 in engagement with pin 182, as shown in Fig. 14. But when change of temperature in the room being conditioned causes the nose 137 of the thermostat-controlled arm to leave contact surface 127 and go to non-conducting surface 200, the breaking of the thermostat circuit will release the armature 179 and the arm 178 will drop making contact with the lower part of piece 177, whereupon the circuit of motor 181 will again be closed and will again operate to turn shaft 152 and attached disk 181. A pin 184 extends from a point on the disk 181 on the opposite side of the disk and diametrically opposite from pin 182, as clearly shown in Fig. 10. And when the disk and pin 184 have been rotated a half revolution the pin will be carried to engage the end of a lever 185 pivoted at 186 to supporting plate 187. Through link 188 the swing of the long end or lever 185 is communicated to lever 189 pivoted at 190, and a foot 191 on lever 190 engaging beneath insulated portion 183 of swing arm 178 will lift the arm, as shown in Fig. 10, thus breaking the circuit of motor 174, which stops the motor and disk 181, leaving the arm 178 resting on foot 191 in position to be attracted by relay 147 whenever the thermostat reestablishes the circuit by moving the nose 137 back onto contact piece 177. It follows that whenever the thermostat circuit is closed on the heating side the control swich 148 will be rotated in the direction of the arrow from the neutral or non-circuit closing position of Fig. 10, one half of a revolution. This will first operate the doors 21, 22 or the turntable 78, 79, and at the same time will operate the gas valve 37 or the steam or hot hot water valve 62. Shortly after, the door-operating motor ceases operation. Then about five minutes later the blower 16 or 87—88 and the moistener 32 or 71 are operated and the switch operator is stopped, with all instrumentalities except door-operating motor in operation. When the device is again operated, the gas valve or hot water or steam valve and the moistener valve are immediately turned off. Then the blower operates for five minutes longer and goes off, the switch operator being then returned to the neutral position of Fig. 10.

The means for controling operation of the cooling and drying instrumentalities controlled by thermostat circuit 45—46 are mounted upon the base 156 as indicated diagrammatically by dotted squares 192, 193, 194 on Fig. 10, but need not be specifically described, as they are in all respects duplicates of those already described except for difference in the controlling circuits on the switch controller 150 (clearly indicated in the wiring diagram of Fig. 20, and the development of switch-controller 150 which is shown in Fig. 19). As there shown switch bands 195, 196, 197 are connected respectively with the means for operating the cooling fluid supply means, including either the compressor motor 100, the blower motor 113, and water valve 110 of such means, as shown in the wiring diagram, or the supply valve 66 of the wall unit. The wire 199 goes to the main blower, including the register shutter 51 of the wall unit where that is used. And the wire 201 goes to the second winding 202 of the reversing motor of the door mechanism 21, 22 of the basement unit or the turntable 78—79 of the wall unit. All of these circuits, taking their current from lead-in wire 159, are completed to the outwire 203. Induced current of suitable low voltage is supplied to the thermostat circuits by lead-in wire 204 from transformer 205, and current is supplied to motor 174 of switch operator 150 by lead-in wire 206.

From the above it will clearly appear that by by extremely simple means air-conditioner mechanism, either of the wall-unit or the basement unit type, for summer and winter air-conditioning is controlled on operation of both its summer and its winter air-conditioning operations by a single thermostat subject to the air of the room or rooms whose air is being conditioned, and that this thermostat has the capacity of adjustment for determining the maximum temperature of said room or rooms for winter air-conditioning and the minimum temperature for summer air-conditioning. Further, that this simple highly economical and effective result is made possible by the combination of means in the thermostat for closing and for breaking two thermostat circuits one for controlling the winter and the other the summer air-conditioning temperatures, whereby in either case a motor circuit is closed both by the opening and by the closing of the thermostat circuit, and of means operated by each of said motors for breaking the motor circuit after a predetermined amount of operation of the motor, said means operating so as to permit a reclosing of one or the other motor circuits whenever the thermostat circuit is either closed or broken.

More specifically the advantages of my invention reside in the provision of a summer and winter air-conditioner of the basement unit and of the wall unit types, with electrically-operated means for supplying cold in summer and heat in winter, for supplying moisture in winter, and for moving and controlling the movement of the air being cooled or heated both in summer and winter, including means for directing the course of the air for cooling and for heating, in combination with an independent switch operator for the summer and for the winter air-conditioning devices, and a single thermostat for controlling both.

I claim:

1. In an air-conditioner, air-heating means, air-moistening means, air-moving means, and air movement directing means for winter air-conditioning, with electric circuits for operating all said winter air-conditioning means; air-cooling means, air-moving means, and air-movement directing means for summer air-conditioning, with electric circuits for operating all said summer air-conditioning means; a switch operator for controlling all the electric circuits of the winter air-conditioning means, a second switch-operator for controlling all the electric circuits of the summer air-conditioning means, and a single thermostat for independently controlling operation of said two switch-operators.

2. Switch-operating means for controlling air-conditioning devices, comprising a rotatable cylinder, a motor for rotating the same, an electric circuit for said motor including a pair of contacts and an arm normally held to engage one contact which is adapted to move between the contacts and close the circuit by engagement with either contact, a thermostat and an electric circuit closed and broken thereby, a relay energized and de-energized by closing and breaking of said thermostat circuit for moving said arm into non-normal engagement with one of said contacts, and a member rotating with said cylinder for moving said arm in opposition to the force of said relay, whereby said motor circuit is broken and said arm is held in non-contacting position by said member and said relay into position to be released to make said normal contact when said relay is de-energized.

3. Switch-operating means for controlling air-conditioning devices, comprising a rotatable cylinder, a motor for rotating the same, an electric circuit for said motor including a pair of contacts and an arm normally held to engage one contact which is adapted to move between the contacts and close the circuit by engagement with either contact, a thermostat and an electric circuit closed and broken thereby, a relay energized and de-energized by closing and breaking of said thermostat circuit for moving said arm into non-normal engagement with one of said contacts, a member moved a distance determined by a partial revolution of said cylinder to cause said arm to be moved in opposition to the force of said relay to a neutral circuit-breaking position free to make said normal contact when the relay is de-energized, and a member moved a distance determined by a further partial revolution of the cylinder to move said arm away from said normal contact and hold it in position to be moved by the relay against the other contact when the relay again is energized.

4. Switch-operating means for controlling air-conditioning devices comprising a motor, a shaft, a disk and a cylinder rotated thereby, an electric circuit for said motor including a pair of contacts and an arm normally held to engage one contact which is adapted to move between the contacts and close the circuit by engagement with either contact, a thermostat and an electric circuit closed and broken thereby, a relay energized and de-energized by closing and breaking of said thermostat-circuit for moving said arm into non-normal engagement with one of said contacts, two pins on said disk at opposite ends of a diameter thereof, means whereby one pin after said disk has made a half revolution will effect movement of said arm in opposition to the force of the relay to a neutral circuit-breaking position free to make said normal contact when the relay is de-energized, and means whereby the other pin after the disk has made a further half revolution will effect movement of said arm away from said normal contact and will hold said arm in position to be moved by the relay against the other contact when the relay again is energized.

5. In an air-conditioner, instrumentalities for heat-conditioning air in rooms, instrumentalities for cold conditioning air in rooms, means for moving air subject to either of said instrumentalities, means for controlling movement of said air including a vertical conduit and a register shutter adapted to open therefrom, a temperature-moved member subject to the air of the rooms, two electric circuits adapted to be closed and broken by movements of said member, means for controlling operation of said heat-conditioning instrumentalities and the air-movement controlling means rendered operative by closing and by breaking of one of said circuits, and independent means for controlling operation of said cold-conditioning instrumentalities and air-movement controlling means rendered operative by making and breaking of the other thermostat circuit.

6. In an air conditioning system, instrumentalities for heat-conditioning the air of rooms during cold weather, other instrumentalities for cold conditioning said air during hot weather, a thermostat having a temperature-controlled contact member a piece contacted thereby formed with two portions of electrical conducting material and an intervening portion of non-conducting material of such width as to determine operation of each of said instrumentalities wholly independent of one another, the marginal lines of which determine respectively the maximum temperature of heat conditioning and the minimum temperature of cold-conditioning, means to move said contact piece to vary said limits, independent means for controlling operation of said two sets of instrumentalities, and means controlled by movements of said contact member on said contact piece for independently controlling each of said independent operation-controlling means.

7. In an air-conditioner, air-heating means, air-moving means, and air-movement directing means for winter air-conditioning, with electric circuits for operating all said winter air-conditioning means; air-cooling means, air-moving means and air-movement directing means for summer air-conditioning, with electric circuits for operating all said summer air-conditioning means; a switch operator for controlling all the electric circuits for the winter air-conditioning means, a second switch operator for controlling all the electric circuits for the summer air-conditioning means, and a single thermostat for independently controlling operation of said two switch operators.

8. In an air-conditioner, air-heating means and air-moving means for winter air-conditioning, with electric circuits for operating all said winter air-conditioning means; air-cooling means and air-moving means for summer air-conditioning, with electric circuits for operating all said summer air-conditioning means; a switch operator for controlling all electric circuits for the winter air-conditioning means, a second switch operator for controlling all electric circuits of the summer air-conditioning means, and a single thermostat for independently controlling operation of said switch operators.

9. In an air-conditioner, a multiplicity of separate instrumentalities for conditioning the air each embodying an independent electric circuit, a switch operator comprising a drum with a multiplicity of contact pieces thereon adapted to be contacted by independent fingers in said several electric circuits, a thermostat embodying an independent electric circuit and means thermostatically controlled for making and breaking said last-named circuit, a motor for rotating said drum, an electric circuit for said motor, and means rendered operative by closing also by breaking said thermostat circuit for closing the motor circuit.

10. In an air-conditioner, a multiplicity of separate instrumentalities for conditioning the air each embodying an independent electric circuit, a switch operator comprising a drum with a multiplicity of contact pieces thereon adapted to be contacted by independent fingers in said several electric circuits, a thermostat embodying an independent electric circuit and means thermostatically controlled for making and breaking said last-named circuit, a motor for rotating said drum, an electric circuit for said motor, means rendered operative by closing also by breaking said thermostat circuit for closing the motor circuit, and means rotating in time with the drum to break the motor circuit at the end of each half revolution of the drum.

11. In an air-conditioner, a multiplicity of separate instrumentalities for conditioning the air each embodying an independent electric circuit, a switch operator comprising a cylindrical drum with a multiplicity of contact pieces thereon adapted to be contacted by independent fingers in said several circuits, said contact pieces being of different lengths not more than a semi-circumference of said cylinder and occupying variant circumferential positions on said cylinder, a motor for rotating said drum, an electric circuit for said motor, a thermostat embodying an independent electric circuit and means thermostatically-controlled for making and breaking said last-named circuit, means rendered operative by closing also by breaking said thermostat circuit for closing the motor circuit, and means for breaking the motor circuit at the end of each half revolution of the drum.

12. In an air-conditioner, a multiplicity of separate instrumentalities for conditioning the air each embodying an electric circuit, a switch operator comprising a drum with a multiplicity of contact pieces thereon adapted to be contacted by independent fingers in said several electric circuits, the several contact pieces being of different lengths and each extending circumferentially not more than a semi-circumference of the cylinder, and thermostatically-controlled means for causing the drum to rotate successively half revolutions at a time, whereby the starting and the stopping of the several instrumentalities will be at different and separated time periods.

FRANK A. WHITELEY.